No. 723,413. PATENTED MAR. 24, 1903.
R. J. SHEEHY.
ENGINE CONTROLLING APPARATUS.
APPLICATION FILED JUNE 7, 1901.
NO MODEL.
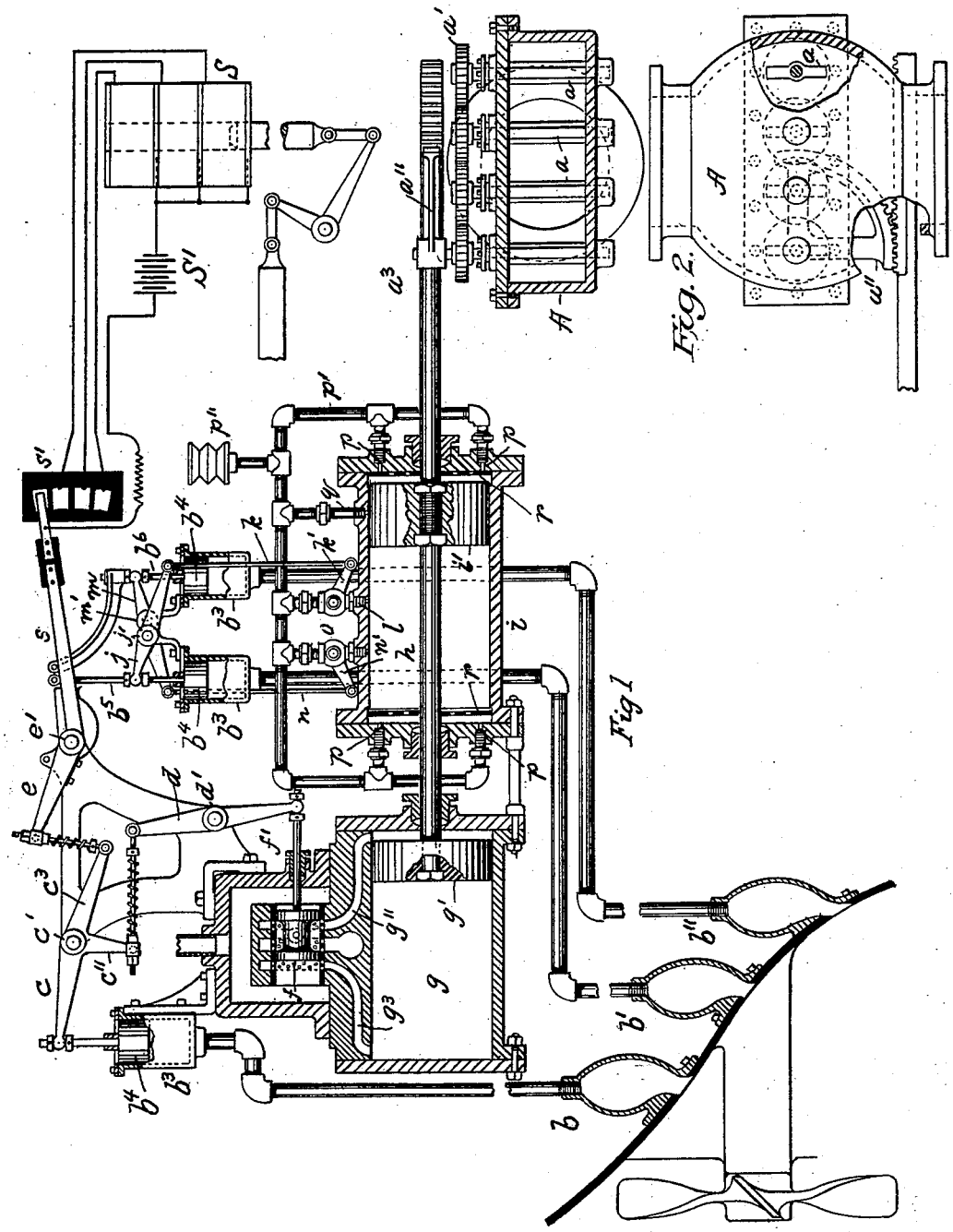

UNITED STATES PATENT OFFICE.

ROBERT J. SHEEHY, OF NEW YORK, N. Y.

ENGINE CONTROLLING APPARATUS.

SPECIFICATION forming part of Letters Patent No. 723,413, dated March 24, 1903.

Application filed June 7, 1901. Serial No. 63,521. (No model.)

*To all whom it may concern:*

Be it known that I, ROBERT J. SHEEHY, a citizen of the United States, residing at the city of New York, in the borough of Manhattan and State of New York, have invented certain new and useful Improvements in Engine Controlling Apparatus, of which the following is a full, clear, and exact description.

This invention relates to the automatic control of power devices in accordance with variations of the load to which they may be subjected.

The particular object of the present invention is to alter the speed of the main engine step by step in proportion to the variation of the load upon the engine.

The invention is especially adapted to the control of marine engines wherein it is desirable to instantaneously control the speed of the engine on account of the rolling or pitching of the ship carrying the propeller out of water, which causes the engine to race.

In accordance with this invention I utilize the height of water in a plurality of tubes opening at different elevations in the bottom of the ship adjacent to the propeller, the water in the several tubes acting in succession through a suitable power device to move a valve controlling the main engine, all as will be fully described hereinafter with reference to the accompanying drawings, and pointed out in the claims.

In the accompanying drawings, Figure 1 is a view, partially in section and partially in elevation, of a conventional representation of the present invention. Fig. 2 is a side elevation of the valve-casing of the main engine with parts broken away for clearness of illustration.

The main engine to be controlled is represented in this instance only by a portion of a steam-passage in which is located a controlling-valve. Such portion is indicated by the letter A, and consists of a valve-casing adapted to be inserted either in a high-pressure steam-pipe before it enters the cylinders of the engine or in the exhaust-steam pipe between the low-pressure cylinder and the condenser. In the former case the valve would throttle the admission of live steam to the engine, while in the latter, which is the preferred arrangement, the valve would cause a backing up or choking of the steam, which would be quite as effectual in retarding the engine as the throttling of the supply. The construction of this main valve consists of a plurality of shutter-slats $a$, mounted on independent axes and all geared together by the gear-wheels $a'$. The slats are preferably located in a flattened or rectangular portion of the steam-passage, as shown. To operate this valve, one of the axes is extended and carries a gear-segment $a''$, which is engaged by a reciprocating rack-bar $a^3$. Adjacent to the sleeve through which the propeller-shaft passes a number of tubes, three being shown, are connected through the bottom of the ship to allow the entrance of water therein. Some of these openings are below the shaft, while others are above it, their arrangement being such that the vertical space covered by them shall be substantially equal to that covered by the propeller, so that when the propeller is more or less out of water there will be one or more of these openings exposed. The tubes connected with these openings are represented by $b$, $b'$, and $b''$. Each of these tubes connects with a small cylinder $b^3$, in which is located a piston $b^4$. The piston in tube $b$ connects by means of its rod with a lever $c$, pivoted at $c'$ and having two arms, one of which, $c''$, connects through a rod with another lever $d$, pivoted at $d'$, and the other, $c^3$, connects with a lever $e$, pivoted at $e'$. Lever $d$ engages with the valve-rod $f'$ of a valve $f$, which valve is located in the steam-chest and forms the valve of an engine $g$. This engine is double-acting, its piston being represented by $g'$ and its two inlet-ports by $g''$ and $g^3$, respectively. The movement of this valve from one extreme position to the other acts like other engine-valves to admit steam alternately to the opposite ends of the cylinder. The piston-rod $h$ of this engine extends into another cylinder $i$, placed axially in line with it, and is therein connected with a piston $i'$, adapted to move in said cylinder $i$. Thence the said rod $h$ passes on and connects with the rack-bar $a^3$, as it is through this arrangement that the valve in the main-engine steam-pipe is moved, as will presently appear. The cylinder $i$ and its piston are intended to control the movements of the piston $g'$ under the action of the steam by successively opposing its movement in a manner to be hereinafter described. The piston in the tube $b'$ connects through its rod $b^5$ with a lever $j$, pivoted at $j'$, which in turn is connected with a rod $k$, leading to a crank $k'$ on a venting-cock $l$, which taps the cylinder $i$ at about its middle point. This venting-cock when open allows the escape of pressure from the cylinder $i$. The piston in tube $b''$ connects by means of its piston-rod $b^6$ with another lever $m$, pivoted at $m'$, which in turn is connected with a rod $n$, leading to the crank $n'$ of a second vent-cock $o$ for the cylinder $i$, located between the vent $l$ and the head of the cylinder. The heads of the cylinder $i$ are also perforated, as indicated at $p$, and these perforations, together with the passages through the two vent-cocks, are all connected to a pipe $p'$, which is in communication with a reservoir $p''$. At that end of the cylinder $i$ opposite the vent-cocks there is also an opening in the side of the cylinder, (indicated by $q$,) which is likewise in connection with the said pipe $p'$. Adjacent to each head of the cylinder $i$ is a perforated disk $r$, the holes in which are arranged out of line with the perforations in the head of the cylinder and the disk having ground surfaces, so that when it is flattened against the head of the cylinder it will act as a valve to prevent the exit of the fluid from the cylinder in the pipe $p'$. The disk is held closely adjacent to the cylinder-head, but with a certain freedom of play, by a groove, in which it is confined at its edges.

The operation of the apparatus so far described in effecting the control of the main engine is as follows: When the parts are in the position shown in the drawings, the ship is supposed to be resting upon an even keel, or substantially so. Now in case the ship rolls or pitches to an extent to lift the propeller out of the water the water will simultaneously flow out of the tubes $b$, $b'$, and $b''$ and will empty the upper tube $b$ first. This will allow the piston in said tube to fall, which will result in throwing the valve $f$ to its extreme left-hand position. Steam will be admitted into the right-hand end of cylinder $g$ and the piston $g'$ will move toward the left, carrying piston $i'$ with it and partially closing the valve A, thus partially slowing down the engine. The tendency of piston $g'$ will be to make its full stroke to the left, but the moment piston $i'$ commences to move the disk $r$ will be forced against the head of the cylinder $i$ by the compression of the fluid, which may be a gas or liquid, in the cylinder and the pistons will be stopped just before piston $i'$ reaches the vent $l$, these vents being normally closed. If the propeller rises farther out of the water, the second tube $b'$ will be emptied, causing its piston to fall and opening the vent-cock $l$. This will release the fluid-pressure in cylinder $i$ into pipe $p'$ and reservoir $p''$, and the steam, which is still acting against the right side of the piston $g$, will carry the piston still farther to the left, until piston is again stopped just before it reaches the vent-cock $o$. It will be seen that in this second movement piston $i'$ automatically closes the open vent-cock $l$. This movement closes the valve A a little more and slows the engine down correspondingly. If the propeller rises farther from the water, tube $b''$ is emptied and the vent-cock $o$ is opened, thus allowing the pistons to complete their stroke to the left except for a small distance, which is allowed for an air-cushion to prevent the pistons from striking the heads of the cylinders. At the end of the stroke the speed of the main engine is supposed to have been reduced to the minimum, and it will be readily understood that this step-by-step motion could be made more gradual by using more of the tubes and more of the vent-cocks. In moving from one end of the cylinder to the other the piston $i$ forces the fluid out of one end of the cylinder through the pipe $p'$ and into the other end, the pressure coming through the right-hand head of the cylinder serving to force the disk away from it. This circulation system of course is not essential to my invention, since the several vents may be opened directly to the atmosphere; but it is desirable to be able to use the same air or fluid constantly, and thereby avoid particles of dust which might get into the apparatus and obstruct or prevent the proper seating of the flat disks or some of the pistons. When the propeller returns to the water, the same gradual increase of speed of the main engine can be effected by a similar action of venting-cocks such as previously described, if it is so desired; but according to the arrangement illustrated the return stroke of the piston is not effected until the water enters the tube $b$, at which time the propeller is nearly if not quite entirely submerged. When this takes place, water flowing into the tube $b$ lifts the piston $b^4$ in that tube and returns the valve $f$ to the position shown in the drawings, whereupon steam enters the left-hand end of the cylinder $g$ and forces the piston over a full stroke to the right, which stroke is limited only by an air-cushion formed at the right-hand end of cylinder $i$ after piston $i'$ covers the normally open escape-port $q$. In this way the main engine is given its full speed immediately after the propeller becomes fully submerged. The valve is held in this position by the presence of steam on the left side of piston $g'$.

Electrical devices are used in connection with this apparatus to indicate on the bridge or elsewhere the several operations of the apparatus. These indications may be useful in disclosing when the apparatus is working properly and also as a record of the movements of the engine.

$s$ is a circuit-closing lever adapted to move over a series of circuit-terminals of the block $s'$. This lever is moved from the first to the second terminal by the falling of the piston in tube $b$ by reason of the connection between levers $e$ and $s$. Said lever $s$ is moved from the second to the third terminal by the falling of the piston in tube $b'$ by reason of the connection of its piston-rod with the lever $s$, and in like manner the lever $s$ is moved from the third to the fourth terminal by the piston in tube $b''$. These terminals are connected, respectively, with sections of a sectionally-wound solenoid S, the return-circuit from said sections being through battery S' to the lever $s$. As the circuit through each section is closed the core of the solenoid is moved inward in successive steps. This motion may be used to operate an indicator of any approved construction.

I claim—

1. The combination with the governing devices of a marine engine, of an auxiliary engine adapted to move said devices, means whereby a change in the draft of the ship will admit pressure to the engine, a retarding device opposing the movement of the engine and means whereby a further change in the draft of the ship will control said retarding device, substantially as described.

2. The combination with the governing devices of a marine engine, of an auxiliary engine for moving said devices a piston moved by said auxiliary engine, a fluid-cushion adapted to retard said piston and means whereby a gradual change in the draft of the ship will first start the engine and then control said fluid-cushion for the purpose set forth.

3. The combination with the governing devices of a marine engine, of an auxiliary engine for moving said devices a piston moved by said auxiliary engine, a fluid-cushion adapted to retard said piston, a valve or valves controlling said fluid-cushion a plurality of tubes opening through the bottom of the ship at successively higher points, pistons subjected to the pressure in said tubes and means whereby said pistons will first start the auxiliary engine and then successively control the fluid-cushion.

In witness whereof I subscribe my signature in presence of two witnesses.

ROBERT J. SHEEHY.

Witnesses:
WM. A. ROSENBAUM,
WALDO M. CHAPIN.